United States Patent
Ishimoto

(10) Patent No.: US 6,618,085 B2
(45) Date of Patent: Sep. 9, 2003

(54) IMAGE PICKUP APPARATUS FOR CONTROLLING THE DISCHARGE OF INFORMATION CHARGES IN THE IMAGE PICKUP APPARATUS

(75) Inventor: Kazuo Ishimoto, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 08/978,071

(22) Filed: Nov. 25, 1997

(65) Prior Publication Data

US 2003/0122947 A1 Jul. 3, 2003

(30) Foreign Application Priority Data

Nov. 27, 1996 (JP) .............................................. 8-316601

(51) Int. Cl.[7] ................................................. H04N 3/14
(52) U.S. Cl. ........................ 348/294; 348/295; 348/312
(58) Field of Search ................................. 348/222, 294, 348/295, 296, 297, 299, 314, 317, 319, 362, 132, 312

(56) References Cited

U.S. PATENT DOCUMENTS

| | | | | |
|---|---|---|---|---|
| 4,875,101 A | * | 10/1989 | Endo et al. | 348/297 |
| 4,896,211 A | * | 1/1990 | Hunt et al. | 348/132 |
| 5,233,428 A | * | 8/1993 | Alford et al. | 348/296 |
| 5,694,167 A | * | 12/1997 | Hashimoto | 348/297 |
| 5,777,670 A | * | 7/1998 | Sawanobori et al. | 348/297 |
| 5,920,343 A | * | 7/1999 | Watanabe et al. | 348/222 |
| 5,926,219 A | * | 7/1999 | Shimizu et al. | 348/296 |
| 6,040,859 A | * | 3/2000 | Takahashi | 348/296 |

FOREIGN PATENT DOCUMENTS

| | | | | |
|---|---|---|---|---|
| JP | 3022768 | 1/1991 | .......... | H04N/5/335 |
| JP | 3048586 | 3/1991 | .......... | H04N/5/335 |
| JP | 7087404 | 3/1995 | .......... | H04N/5/335 |

* cited by examiner

Primary Examiner—Wendy R. Garber
Assistant Examiner—Luong Nguyen
(74) Attorney, Agent, or Firm—Hogan & Hartson, LLP

(57) ABSTRACT

Image information can be supplied from an image pickup apparatus to computer equipment at high speed. A solid state image pickup device 1 is vertically driven by a vertical drive circuit 2v and horizontally driven by a horizontal drive circuit 2h. The vertical drive circuit 2v operates at a given cycle in response to a vertical timing signal VT from a vertical timing control circuit 21v which operates according to a frequency dividing clock DCK with a given cycle. The horizontal drive circuit 2h operates in response to a horizontal timing signal HT from a horizontal timing control circuit 21h to be driven in response to a transfer trigger TR which is supplied from the computer equipment. An exposure control circuit 23 responds to a horizontal transfer flag HF which is supplied from the horizontal timing control circuit 21h and determines timing for discharge driving excluding a period of the horizontal transfer drive.

12 Claims, 5 Drawing Sheets

IMAGE PICKUP APPARATUS FOR CONTROLLING THE DISCHARGE OF INFORMATION CHARGES IN THE IMAGE PICKUP APPARATUS

BACKGROUND OF THE INVENTION a) Field of the Invention

The present invention relates to an image pickup apparatus for supplying computer equipment with image information.

b) Description of the Related Art

FIG. 1 is a block diagram showing the structure of an image pickup apparatus having a frame transfer type CCD solid state image pickup device. FIG. 2 is a timing chart illustrating the operation of the same image pickup apparatus.

A CCD solid state image pickup device 1 has an image pickup portion 1$i$, a storage portion 1$s$, a horizontal transfer portion 1$h$ and an output portion 1$f$. The image pickup portion 1$i$ comprises a plurality of vertical shift registers which are arranged parallel to one another. Respective bits of these vertical shift registers form optical pixels. Such multiple optical pixels of the image pickup portion 1$i$ are arranged in the form of a matrix, and information charges are produced on the respective pixels corresponding to the image of an object and independently accumulated in the respective pixels. The storage portion 1$s$ comprises a plurality of vertical shift registers, which are connected to the respective vertical shift registers configuring the image pickup portion 1$i$. The number of bits of the respective vertical shift registers of the storage portion 1$s$ is set to conform to the number of bits of the vertical shift registers of the image pickup portion 1$i$. The storage portion 1$s$ can temporarily store information charges for a single image plane being transferred from the vertical shift registers of the image pickup portion 1$i$. The horizontal transfer portion 1$h$ comprises a single horizontal shift register. The respective outputs of the multiple vertical shift registers of the storage portion is are connected to the respective bits of the horizontal shift register. The horizontal shift register sequentially receives information charges which are transferred in one bit units from the multiple vertical shift registers of the storage portion is and transfers them on a line-by-line basis to the output portion 1$f$. The output portion If comprises an electrically independent capacitor and an amplifier, which detects a potential change in the capacitor. The information charges transferred from the horizontal shift register of the horizontal transfer portion 1$h$ are received on a pixel-by-pixel basis by the capacitor, and converted into a voltage value. A change in the voltage value is output as an image signal Y0(t).

A vertical drive circuit 2$v$ produces a polyphase vertical transfer clock φ$v$ in response to a vertical timing signal VT and supplies it to the image pickup portion 1$i$ of the solid state image device 1. The information charges for a single image plane, which are produced and stored on each optical pixel of the image pickup portion 1$i$, are synchronized with the vertical timing signal VT and transferred from the image pickup portion 1$i$ to the storage portion 1$s$ at high speed. The vertical drive circuit 2$v$ produces a polyphase storage clock φ$s$ in response to a horizontal timing signal HT and supplies it to the storage portion 1$s$. The information charges for a single image plane stored in the storage potion 1$s$ are transferred on a line-by-line basis to the horizontal transfer portion 1$h$ at every cycle of the horizontal timing signal HT.

The storage clock φ$s$ also includes a high-speed clock pulse synchronized with the vertical transfer clock φ$v$ for transferring the information charges, which are transferred from the image pickup portion 1$i$ at high speed, into the storage portion 1$s$. The vertical drive circuit 2$v$ supplies a drain region with a discharge clock φ$d$, which is started during a vertical scanning period in response to a discharge timing signal DT. The drain region absorbs the electric charges produced excessively in the image pickup portion 1$i$ of the solid state image pickup device 1. The discharge clock φ$d$ controls electric potential in the drain region to discharge the information charges which are stored in the image pickup portion 1$i$. A period L, during which the information charges are completely discharged by the discharge clock φ$d$ and the information charges are started to be transferred by the vertical clock φ$v$, is an accumulation time of the information charges (i.e., an image pickup period) in the image pickup portion 1$i$. The image pickup period of the solid state image pickup device 1, namely a shutter speed, can be controlled according to a change in timing of the discharge clock φ$d$ applied to the substrate. Such methods for discharging information charges are disclosed in, for example, Japanese Patent Laid-Open Publication No. Hei 3-22768 and Japanese Patent Laid-Open Publication No. Hei 3-48586.

A horizontal drive circuit 2$h$ produces a horizontal transfer clock φ$h$ in response to the horizontal timing signal HT and supplies it to the horizontal transfer portion 1$h$ of the solid state image pickup device 1. Accordingly, the information charges, which are transferred on a line-by-line basis from the storage portion is to the horizontal transfer portion 1$h$, are transferred serially to the output portion 1$f$. The horizontal drive circuit 2$h$ produces a reset clock φ$r$ synchronized with the horizontal transfer clock φ$h$ and supplies it to the output portion 1$f$. Thus, information charges stored in the capacitor of the output portion 1$f$ are discharged on a pixel-by-pixel basis. In other words, the quantity of electric charges is converted into the voltage value on a pixel-by-pixel basis.

A horizontal timing control circuit 3$h$, which includes a counter for counting a base clock BCK with a given cycle, divides the base clock BCK at a predetermined ratio to produce a horizontal timing signal HT with a horizontal scanning cycle. For example, according to an NTSC method, a base clock BCK having a frequency of 14.32 MHz, which is 4 times larger than a frequency of 3.58 MHz of a color subcarrier used in the signal processing, is divided into 1/910 to produce the horizontal timing signal HT. A vertical timing control circuit 3$v$ which includes a counter for counting the horizontal timing signal HT divides the horizontal timing signal at a predetermined ratio to produce a vertical timing signal VT with a vertical scanning cycle. For example, according to the NTSC method, the vertical timing signal VT is produced by further dividing the horizontal timing signal HT, which is the base clock BCK with a frequency of 14.32 MHz divided by 910, by 2/525. Thus, respective timing of the horizontal and vertical scanning of the solid state image pickup device 1 are determined.

An analog signal processing circuit 4 captures the image signal Y0(t), which is output from the solid state image pickup device 1, and produces an image signal Y1(t) having a signal processed according to a predetermined format by performing processing such as sample-and-hold, holding and level-compensation. An A/D conversion circuit 5 captures the image signal Y1(t) and converts the analog value into digital data on a pixel-by-pixel basis to produce image data D0(n). A digital signal processing circuit 6 captures the image data D0(n) and performs processing such as color separation or color difference matrix and balance modulation to produce image data D1(n) including luminance data and color difference data. The image data D1(n) thus produced is sent to a display device such as a TV monitor, or is recorded on a recording medium such as a videodisc.

An exposure control circuit 7 produces a discharge-timing signal. The exposure control circuit 7 integrates the image data D0(n) output from the A/D conversion circuit 5 on a pixel-by-pixel basis and changes timing to produce a discharge timing signal DT according to the integrated value. In other words, this discharge timing signal DT is produced with delayed timing if the integrated value with respect to the image data D0(n) exceeds an appropriate range. The accumulation time L of the information charges is therefore made short. However, the discharge timing signal DT is produced with hastened timing if the integrated value does not reach the appropriate range, which extends the accumulation time L of the information charges. Accordingly, feedback is controlled to keep the solid state image pickup device 1 in an appropriate exposure condition.

Image scanners are now often used to scan a subject original when image data is input to computer equipment such as a personal computer or the like. Furthermore, use of an image pickup apparatus such as a video camera capable of taking a movie picture has also been considered. To connect the image pickup apparatus provided with a solid state image pickup device to the computer equipment, an expansion board, which is called a video capture board, is mounted on the computer equipment. An image signal being output from the image pickup apparatus is converted into a signal suitable for the computer equipment, thereby capturing the signal into a memory mounted on the computer equipment.

FIG. 3 is a block diagram showing the structure of a video capture board. A video capture board 10 comprises a frame memory 11, a synchronous detection circuit 12, a timing control circuit 13, and an interface circuit 14. The frame memory 11 stores image data D1(n), which is input from the image pickup apparatus on a screen-by-screen basis. A dual port type dynamic RAM is used as the frame memory 11 to simultaneously write and read the image data D1(n). The synchronous detection circuit 12 detects synchronous components contained in the image data D1(n), which is input from the image pickup apparatus, and produces a timing pulse according to timing of vertical and horizontal scanning. According to the timing pulse supplied from the synchronous detection circuit 12 and the instructions supplied from the personal computer, the timing control circuit 13 controls timing of writing and of reading the image data D1(n) to and from the frame memory 12. The image data D1(n) input from the image pickup apparatus on a screen-by-screen basis is stored in the frame memory 11 on a screen-by-screen basis, and it is also read on a screen-by-screen basis and transferred to the personal computer at the same time.

According to instructions from the timing control circuit 13, the interface circuit 14 reads the image data D1(n) stored in the frame memory 11 and transfers it to the personal computer. The interface circuit 14 sends interrupt instructions, which are output from the timing control circuit 13, to the personal computer and supplies the timing control circuit 13 with read-out instructions which are sent from the personal computer. Thus, the image data D1(n) to be stored in the frame memory 11 is transferred to the personal computer with desired timing.

In response to commands conforming to keyboard-entered commands or operation programming, the personal computer which captures image data from the video capture board 10 repeats time-sharing processing such as capturing of image data, performing various types of operations, accessing the built-in memory, and controlling the screen display. However, as it is difficult to capture image data successively at high speed, the processing may fall behind the operation of the image pickup apparatus. For example, image data of dozens of frames per second is captured from the image pickup apparatus according to a general television system such as an NTSC system or a PAL system, while a normal personal computer has a limited capacity of capturing image data of several frames per second. The video capture board 10 is configured to take a part of the image data by the write control of the frame memory 12 and to transfer the partial image data only to the personal computer.

Since such an image pickup system has an expensive video capture board 10 which requires a high-capacity frame memory 11, it is considered to activate the image pickup apparatus in accordance with the operation of the computer equipment. For example, according to the technology disclosed in Japanese Patent Laid-Open Publication No. Hei 7-87404, the computer equipment controls the timing of activating the vertical scanning and horizontal scanning of the image pickup device to take image data, which is obtained by the image pickup apparatus, directly into the computer equipment.

However, since the computer equipment must perform a number of processes in various ways in order to control the timing of the vertical and horizontal scans of the image pickup device, such processing becomes a large burden on the computer equipment. Therefore, the image data cannot be transferred from the image pickup device to the computer equipment at high speed.

SUMMARY OF THE INVENTION

Under such circumstances, it is an object of the present invention to reduce the cost of an image pickup system for capturing image information into computer equipment and to enable quick transfer of the image information to the computer equipment.

The invention has been designed to remedy the drawbacks described above. It is characterized by an image pickup i apparatus which takes pictures of an object and supplies computer equipment with image information on a screen-by-screen basis, comprising a solid state image pickup device on which a plurality of pixels are arranged in the form of a matrix and which stores information charges corresponding to the object image on the respective pixels; a vertical timing control circuit which determines repeatedly a vertical scanning period of the solid state image pickup device in a given period according to a reference clock with a given cycle; a horizontal timing control circuit which is synchronized with the reference clock and determines horizontal scanning timing of the solid state image pickup device in response to a transfer trigger supplied from the computer equipment; a drive circuit which discharges the information charges accumulated on the respective pixels of the solid state image pickup device and outputs to transfer sequentially on a line-by-line basis information charges newly stored after a lapse of a desired period upon being controlled by the vertical timing control circuit and the horizontal timing control circuit; and an exposure control circuit which determines a period between timing for discharging the information charges of the solid state image pickup device and timing for starting the information charge transferring output according to a level of the image signal.

In this device, the exposure control circuit completes the discharge of the information charges of the solid state image pickup device within a retrace line period of the horizontal scanning determined by the horizontal timing control circuit.

Thus, since it becomes unnecessary to control the timing to start the vertical scanning of the solid state image pickup device from the computer equipment, a burden on the computer equipment is reduced. The electric charge is discharged by the exposure control within a horizontal blanking period, so that a noise due to the operation of discharging the information charge does not superpose on an effective period of the image signal.

The invention has a further feature in the vertical timing control circuit which includes a counter for counting the frequency of horizontal scanning of the solid state image pickup device for each vertical scanning period, and, when a count value of the counter does not reach a predetermined level on completion of the vertical scanning period, suspends the vertical scanning of the drive circuit, and fixes the control condition of the exposure control circuit.

Thus, if the number of horizontal scanning falls short within a predetermined vertical scanning period, i.e., if all information charges cannot be read thoroughly, the vertical scanning period is temporarily doubled, and the information charges are continuously read. Therefore, even if the operation of reading the information charges is delayed, all the information charges on one image plane can be read without fail.

DETAILED DESCRIPTION OF THE PREFERRED EMBODIMENTS

Figure 4:
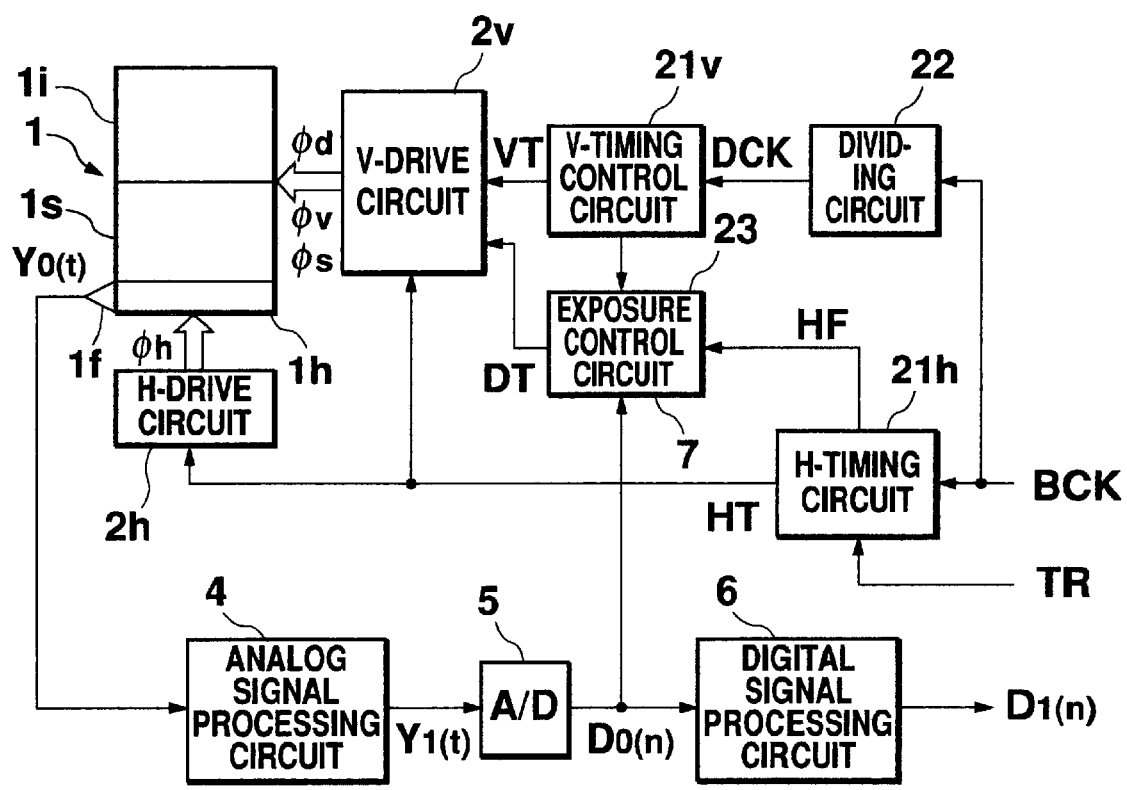
FIG. 4 is a block diagram showing the structure of an image pickup apparatus of the invention.
Figure 5:
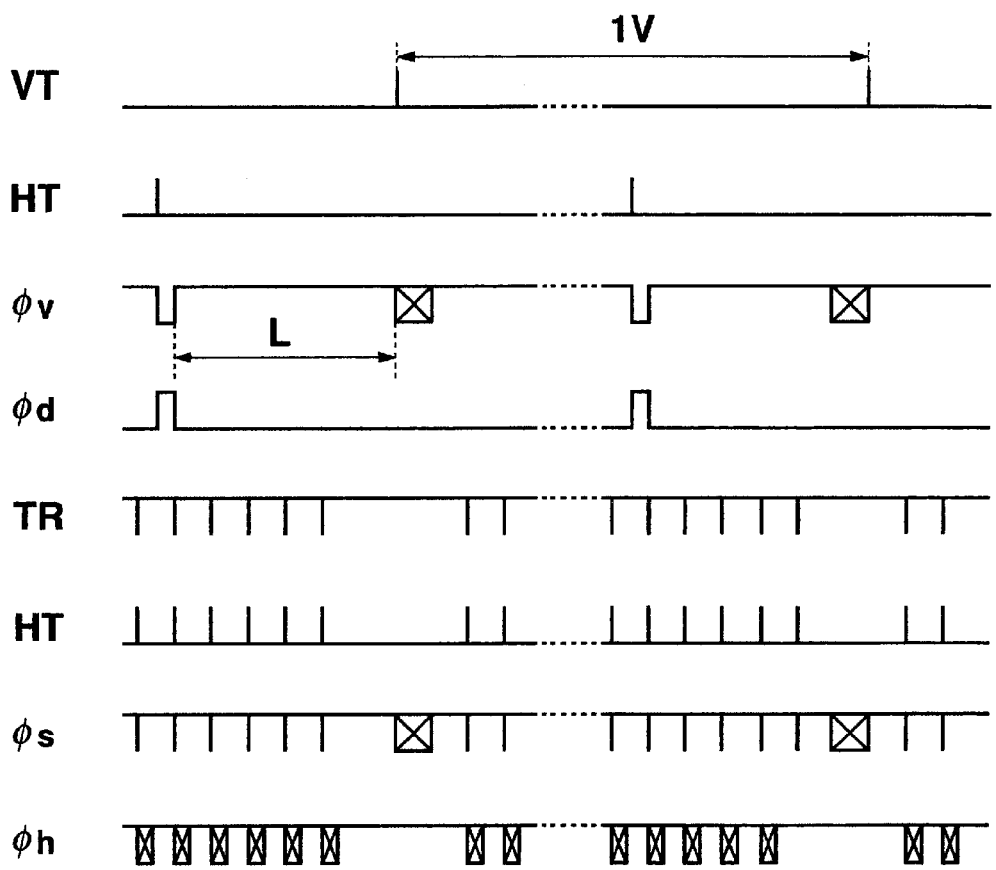
FIG. 5 is a timing chart showing the operation of an image pickup apparatus of the invention.

FIG. 4 is a block diagram showing the structure of an image pickup apparatus of the invention, and FIG. 5 is a timing chart illustrating its operation.

Figure 1:
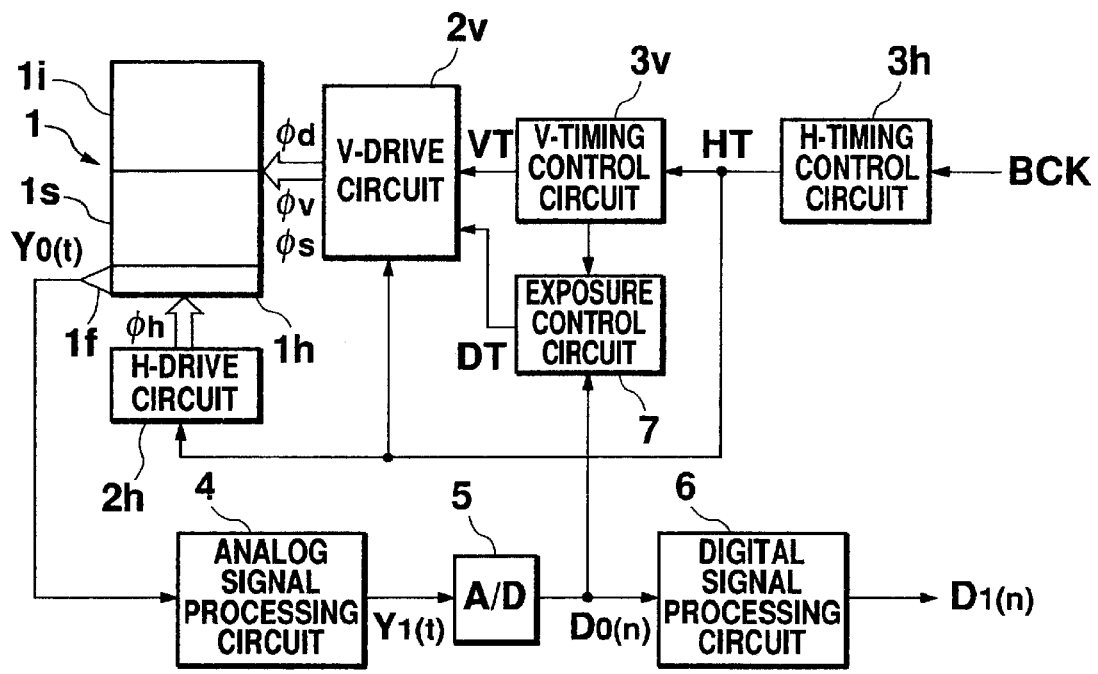
FIG. 1 is a block diagram showing the structure of a conventional image pickup apparatus.
Figure 2:
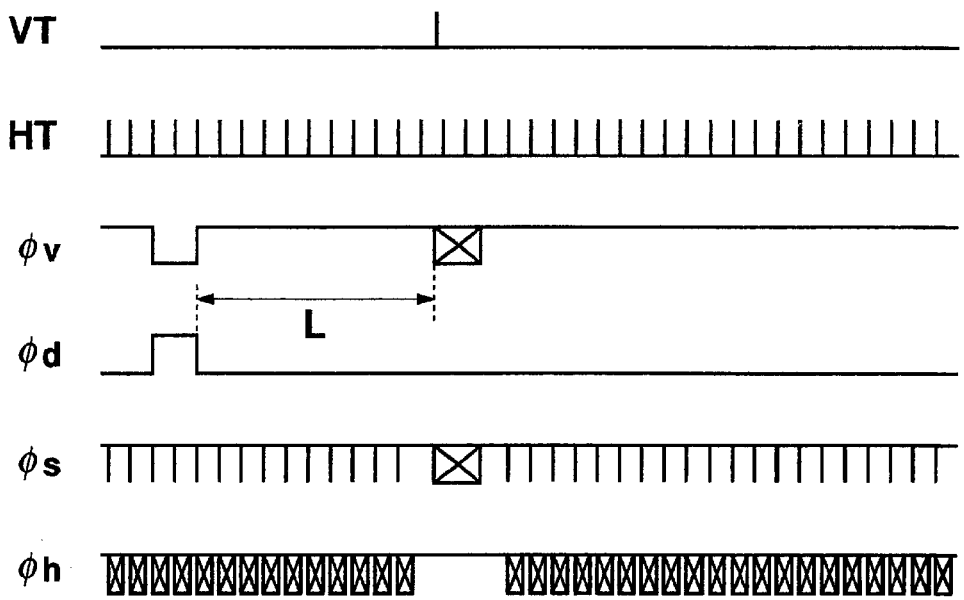
FIG. 2 is a timing chart showing the operation of a conventional image pickup apparatus.
Figure 3:
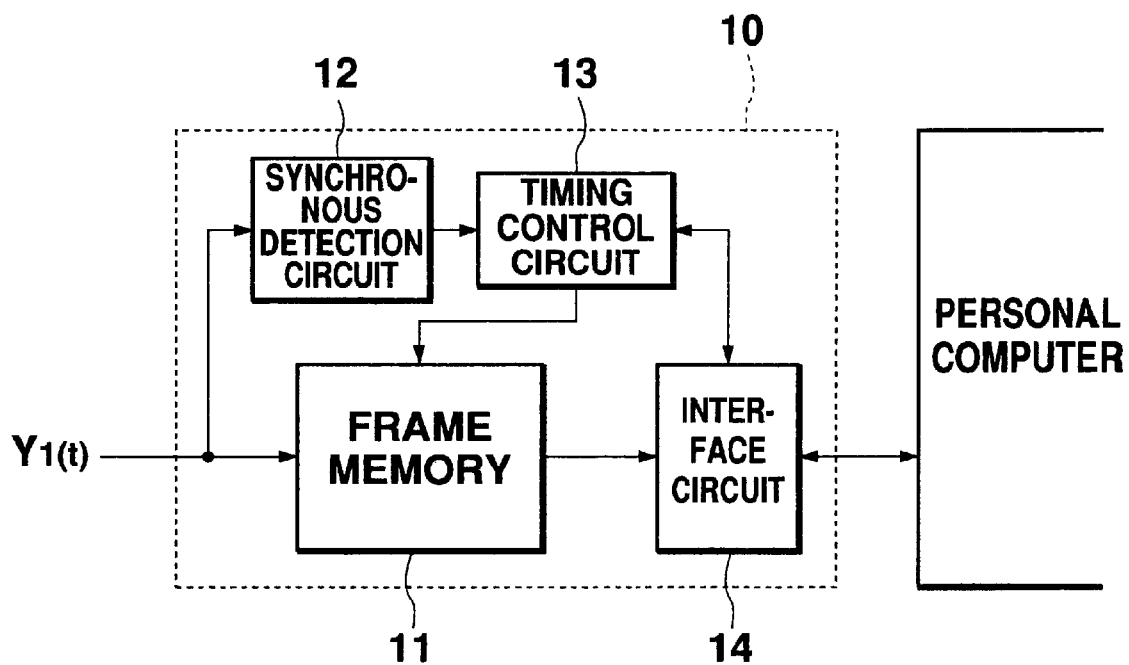
FIG. 3 is a block diagram showing the structure of a video capture board.

A solid state image pickup device 1, a vertical drive circuit 2$v$ and a horizontal drive circuit 2$h$ correspond to those shown in FIG. 1. The respective drive circuits 2$v$, 2$h$ operate to pulse-drive the solid state image pickup device 1 to obtain an image signal Y0(t). Specifically, a vertical transfer clock $\phi v$, a storage clock $\phi s$ and a horizontal transfer clock $\phi h$ are supplied from the respective drive circuits 2$v$, 2$h$ to an image pickup portion 1$i$, a storage portion 1$s$ and a horizontal transfer portion 1$h$ of the solid state image pickup device 1. Information charges for one image plane are transferred on a line-by-line basis to obtain the image signal Y0(t). To make the shuttering operation of the solid state image pickup device 1, a discharge clock $\phi d$ is supplied to a drain region for discharging an excess electric charge formed on the image pickup portion 1$i$, so that the information charges accumulated in the respective optical pixels of the image pickup portion 1$i$ are discharged. The respective drive circuits 2$v$, 2$h$ operate according to a base clock BCK in common use with respective timing control circuits 21$h$ to be described afterward.

An analog signal processing circuit 4, an A/D conversion circuit 5 and a digital signal processing circuit 6 are also the same as those shown in FIG. 1 and configured to obtain image data D1(n) from the image signal Y0(t) being output from the solid state image pickup device 1. Specifically, the image signal Y0(t) is processed as predetermined in the analog signal processing circuit 4 to produce an image signal Y1(t). Image data D0(n) digitized by the A/D conversion circuit 5 is produced from the image signal Y1(t). This image data D0(n) is subjected to a predetermined process by the digital signal processing circuit 6 to produce image data D1(n) containing luminance and color difference data.

The features of the present invention include that timing of horizontal scanning by the solid state image pickup device 1 is set irregularly in response to a transfer trigger TR from the computer equipment and the image pickup apparatus sets as predetermined a cycle of the vertical scanning independent of the computer equipment. Specifically, timing of transferring the information charges on a line-by-line basis from the solid state image pickup device 1 is set in response to the transfer trigger supplied from the computer equipment. An imaging cycle to obtain the information charges for one image plane is set constant on the image pickup apparatus, regardless of the type of computer equipment.

Figure 6:
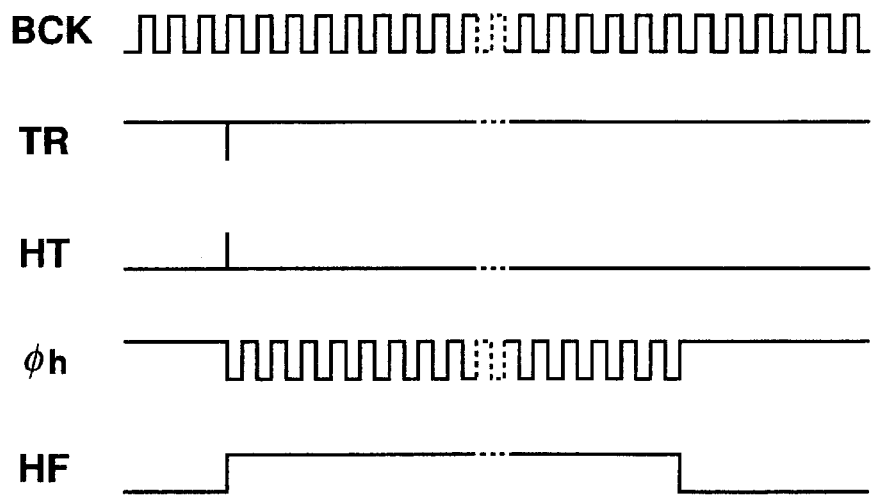
FIG. 6 is a timing chart showing the operation of a horizontal timing control circuit.

The horizontal timing control circuit 21$h$ activates in response to the transfer trigger TR from the computer equipment which receives the image data D1(n) to start up the horizontal timing signal HT in synchronous with the rise timing of the base clock BCK as shown in FIG. 6. This horizontal timing control circuit 21$h$ includes a counter for counting a fixed number of base clock BCK and outputs a horizontal transfer flag HF which is kept high while the base clock BCK is counted for the number of clocks corresponding to the number of pixels in a horizontal direction of the solid state image pickup device 1. Specifically, to detect a period during which the horizontal drive circuit 2$h$, which operates according to the base clock BCK, begins and completes transfer of information charges for one line, the horizontal transfer flag HF is produced so as to rise when the horizontal timing control circuit 21$h$ is activated and to fall after counting the base clock BCK for a fixed number of clocks. This horizontal transfer flag HF is supplied to the computer equipment so that the next transfer flag TR is prevented from being set while the former horizontal transfer flag HF is set.

A vertical timing control circuit 21$v$ includes a counter for counting a frequency dividing clock DCK with a determined cycle and divides the frequency dividing clock DCK at a determined ratio to produce a vertical timing signal VT to determine a vertical scanning period. The frequency-dividing clock DCK is produced from the base clock BCK by a dividing circuit 22 and synchronized with the base clock BCK. The frequency dividing operation of the vertical timing control circuit 21$v$ is always kept constant regardless of the transfer trigger TR from the computer equipment, so that the solid state image pickup device 1 repeats to take images at a determined cycle. At the same time, the vertical timing control circuit 21v supplies an exposure control circuit 23 to be described afterward with the output of the counter for counting the frequency dividing clock DCK as time information. One vertical scanning period (1v) is set by this vertical timing control circuit 21v to such a length that the solid state image pickup device 1 can secure a satisfactory exposing period L and complete the transfer of information charges of all lines configuring one image plane. For example, when the solid state image pickup device 1 corresponds to VGA (Video Graphic Array), the number of vertical pixels is 480, and one vertical scanning period is set to at least 480 times larger than the average cycle of the transfer trigger TR.

The exposure control circuit 23 includes an integrating circuit for integrating the image data D0(n) corresponding to respective pixels configuring one image plane, a comparator circuit for determining whether the integrated value falls within an appropriate range, and an up-down counter for storing the discharge timing of the information charges of the solid state image pickup device 1. The integrating circuit integrates the image data D0(n) in one image plane being output from the A/D conversion circuit 5 and supplies the integrated value to the comparator circuit. The comparator circuit compares two reference values corresponding to the upper and lower limits of the appropriate range with the integrated value of the integration circuit. If it exceeds the upper limit value, the up-down counter performs up counting, and if it has not reached the lower limit value, the up-down counter performs down-counting. The up-down counter stores timing with which the vertical drive circuit 2v discharges the information charges of the solid state image pickup device 1 in correspondence with time information, which is output of the counter for counting the frequency dividing clock DCK of the vertical timing control circuit 21v. And, a discharge timing signal DT is produced when the output of the up-down counter agrees with the time information to give instructions to the vertical drive circuit 2v to discharge the information charges of the image pickup portion 1i of the solid state image pickup device 1. The exposure control circuit 23 receives the horizontal transfer flag HF from the horizontal timing control circuit 21h and does not raise the discharge timing signal DT during a period when the horizontal transfer flag HF is kept at high level because the information charges are transferred from the storage portion is of the solid state image pickup device 1 while the horizontal transfer flag HF is at a high level. If the information charges of the image pickup portion 1i are discharged during the above period, a discharge noise is mixed into the image signal Y0(t). In other words, even if the discharge timing signal DT is required to be produced in the period when the horizontal transfer flag HF is at a high level, the discharge timing signal DT is delayed from rising until the horizontal transfer flag HF is cleared. Accordingly, regardless of the input timing of the transfer trigger TR, the information charges of the image pickup portion 1i are not discharged while the information charges of the storage portion 1s are being transferred. Mixing of noise due to the discharge of the information charges into the image signal Y0(t) can thereby be prevented.

If the vertical scanning period determined by the vertical timing control circuit 21v is insufficient, it is very likely that the information charges of all lines of one image plane cannot be thoroughly read within a single vertical scanning period. If the vertical scanning period is long enough, it is possible to complete the reading of the information charges within the single vertical scanning period without fail, though the number of pictured image planes per unit hour (frame rate) is decreased. Therefore, the vertical scanning period is generally determined on the basis of the longest time which is predicted to be needed to read the information charges of all lines of one image plane.

Figure 7:
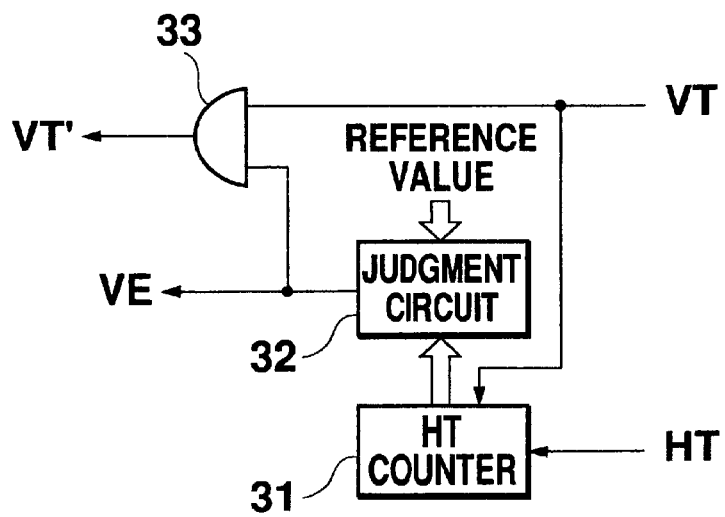
FIG. 7 is a block diagram showing the structure of a control portion for controlling the extension of a vertical scanning period.

The present invention can read the information charges of one image plane from the solid state image pickup device 1 while the vertical scanning period is made short to improve the frame rate. Specifically, the vertical scanning period is extended to two times only when the information charges of one image plane cannot be read completely within one vertical scanning period so that the reading of the information charges can be completed without fail. FIG. 7 is a block diagram showing a configuration of the control portion which judges whether the information charges have been read or not thoroughly and changes the vertical scanning period.

The control portion is disposed between the vertical timing control circuit 21v and the vertical drive circuit 2v, and comprises a counter 31 for counting a horizontal timing signal HT, a judgment circuit 32 for judging a value counted by the counter 31, and an AND gate 33 which allows the vertical timing signal VT to pass.

The counter 31 reset at each timing of the vertical timing signal VT, counts the horizontal timing signal HT and supplies the counted value to the judgment circuit 32. The judgment circuit 32 compares the counted value with a prescribed reference value with timing slightly earlier (for several clocks of the frequency dividing clock DCK) than the next timing of the vertical timing signal VT. If the counted value of the counter 31 has not reached the reference value, the judgment circuit 32 judges that the reading of the information charges of the solid state image pickup device 1 has not completed and raises a vertical scanning period extending signal VE. For example, when the solid state image pickup device 1 has the number of vertical pixels of 480, the reference value of the judgment circuit 32 is set to 480. And when the counted value of the counter 31 within one vertical scanning period has not reached 480, an extension signal VE is raised. This expansion signal VE is input to one (reverse logical input) of the input of the AND gate 33, and the vertical timing signal VT to be input to the other of the input is prevented from passing through the AND gate 33 while the expansion signal VE is at a high level. At the same time, the expansion signal VE is supplied to the exposure control circuit 23 and, when the expansion signal VE is kept at a high level, the exposure control conditions are fixed until the next vertical scanning period. Timing of judging the counted value by the judgment circuit 32 is determined by the vertical timing control circuit 21v according to the falling of a vertical blanking signal produced in synchronous with the vertical timing signal VT. Specifically, in the vertical timing control circuit 21v, a plurality of timing signals with different phases and duty ratios at the same cycle are produced from the output of the counter for counting the frequency dividing clock DCK. And, among the plurality of timing signals, the judgment circuit 32 is operated with timing based on the vertical blanking signals which fall preceding the vertical timing signal VT.

Figure 8:
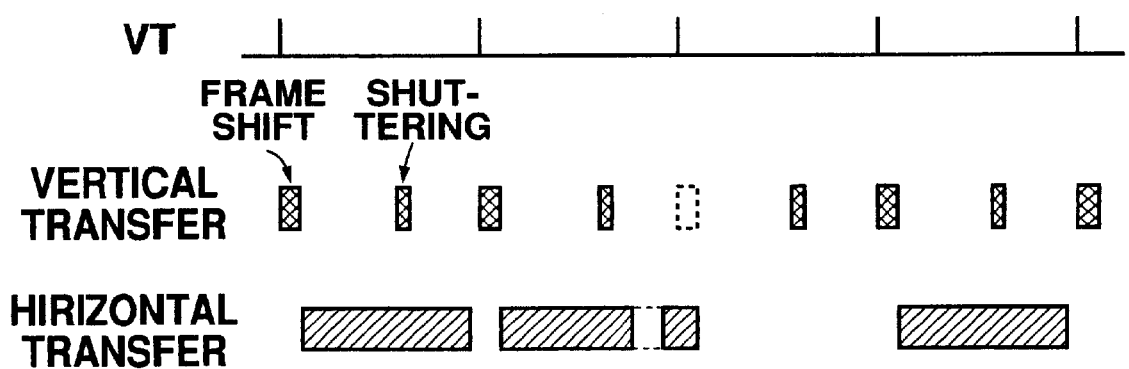
FIG. 8 is a timing chart illustrating the operation of a control portion.

According to the control portion configured as described above, if the transfer trigger TR from the computer delays and the reading (a horizontal transfer per line) of the information charges within one vertical scanning period (1V) cannot be completed as shown in FIG. 8, a high-speed vertical transfer, a so-called frame shift, from the image pickup portion 1i to the storage portion 1s is suspended. In the solid state image pickup device 1, the information charges of the same image plane are held in the storage portion 1s over a plurality of vertical scanning periods, and the information charges are continuously read by the horizontal transfer per line. When the reading of the information charges is completed during the second vertical scanning period after starting to read the information charges, the information charges configuring the next image plane are frame-shifted at the completion of the pertinent vertical scanning period. At that time, the information charges are continuously discharged by the exposure control circuit 23, and exposure control is performed immediately when the frame shift is resumed.

Therefore, it is not necessary to set a long imaging cycle (vertical scanning period) for the solid state image pickup device 1 to provide for a delay of reading the information charges which are produced only in a special operation condition. This vertical scanning period may be determined in a range capable of dealing with when the computer equipment is in a normal operating condition. Even if the frame shift is suspended occasionally, the frame rate can be improved comprehensively.

According to the invention, the computer equipment gives instructions to the image pickup apparatus to transfer image information on a line-by-line basis and to operate the image pickup apparatus with a predetermined vertical scanning cycle, so that the image data can be transferred from the image pickup apparatus at high speed with a burden on the computer equipment reduced. Also, the exposure control of the image pickup apparatus is synchronized with the transfer of image information to the computer equipment, so that a noise due to the operation to discharge the information charges when the exposure is controlled can be prevented from being mixed into the image information.

If the information charges cannot be read completely from the solid state image pickup device, the information charges are read over a plurality of vertical scanning periods, so that the delay to transfer the image information can be dealt with while the vertical scanning period is determined short. Therefore, the transfer cycle (frame rate) of the image information can be improved unless the transfer of the image information is delayed frequently.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. An image pickup apparatus for capturing an image of an object and supplying computer equipment with information of the image on a screen-by-screen basis, comprising:

a solid state image pickup device on which a plurality of pixels are arranged in the form of a matrix, for accumulating information charges corresponding to the object image on the respective pixels;

a vertical timing control circuit for determining repeatedly a vertical scanning period of said solid state image pickup device in a given period according to a reference clock with a given cycle;

a horizontal timing control circuit for determining horizontal scanning timing of said solid state image pickup device, and generating a horizontal transfer flag which designates a transferring period of information charges for one line, in response to a transfer trigger supplied from said computer equipment synchronized with the reference clock;

a drive circuit for discharging said information charges accumulated on the respective pixels of said solid state image pickup device and outputting an image signal to transfer sequentially on a line-by-line basis information charges newly stored after a lapse of a desired period upon being controlled by said vertical timing control circuit and said horizontal timing control circuit; and an exposure control circuit for determining a timing for discharging said information charges of said solid state image pickup device according to a level of said image signal; wherein:

said horizontal timing control circuit rises and clears said horizontal transfer flag corresponding to shift of a horizontal transferring timing of information charges for one line; and said exposure control circuit receives said horizontal transfer flag from said horizontal timing control circuit and delays the discharge timing from rising until the horizontal transfer flag is cleared and completes the discharge of said information charges of said solid state image pickup device within a blanking period, except for the transferring period, determined by the horizontal transfer flag during the vertical scanning period.

2. The image pickup apparatus according to claim 1, wherein said vertical timing control circuit including a counter for counting the number of horizontal scanning of said solid state image pickup device in each vertical scanning period and, when a count value of the counter does not reach a predetermined value on completion of the vertical scanning period, suspends the vertical scanning of said drive circuit, and fixes the control condition of said exposure control circuit.

3. The image pickup apparatus according to claim 1, wherein said horizontal timing control circuit activates said drive circuit in response to the transfer trigger from said computer equipment and invalidates the next transfer trigger for a given period determined according to the number of pixels of one line of said solid state image pickup device and a drive frequency of said drive circuit.

4. An image pickup apparatus for capturing an image of an object and supplying computer equipment with information of the image on a screen-by-screen basis, comprising:

a solid state image pickup device having a plurality of pixels disposed in the form of a matrix with information charges corresponding to the object image produced and accumulated, a plurality of vertical shift registers disposed parallel to one another for temporarily storing a plurality of information charge packets read from the pixels respectively, a horizontal shift register for receiving sequentially the information charge packets from the respective vertical shift registers and outputting to transfer horizontally the plurality of information charge packets, and a drain for discharging the information charges accumulated in the pixels;

a vertical timing control circuit for producing a vertical scanning timing signal at vertical scanning periods defined by a prescribed clock number of a reference clock with a fixed cycle;

a horizontal timing control circuit for generating a horizontal scanning timing signal and a horizontal transfer flag which designates a transferring period of information charges for one line, in response to a transfer trigger which is output from said computer equipment;

a drive circuit for transferring the information charge packets from the pixels to the vertical shift register according to the vertical scanning timing signal and, according to the horizontal scanning timing signal, transferring vertically the information charge packets from the vertical shift register to the horizontal shift register and driving the horizontal shift register to obtain an image signal; and an exposure control circuit for determining timing to discharge the information charges of said solid state image pickup device so that an exposure time, being a period between the discharge of the information charges from the pixels to the drain and the transfer of the information charges from the pixels to the vertical shift register, becomes of a period corresponding to a level of the image signal; wherein:

said horizontal timing control circuit rises and clears said horizontal transfer flag corresponding to shift of a horizontal transferring timing of information charges for one line; and the drive circuit discharges the information charges at a timing defined by the exposure control circuit; and said exposure control circuit receives said horizontal transfer flag from said horizontal timing control circuit and delays the discharge timing from rising until the horizontal transfer flag is cleared and completes the discharge of said information charges within a blanking period, except for the transferring period, determined by the horizontal transfer flag during the vertical scanning period.

5. The image pickup apparatus according to claim 4, wherein said drive circuit outputs the image signal corresponding to one horizontal scanning line from said solid state image pickup device on the horizontal scanning timing signal basis.

6. The image pickup apparatus according to claim 4, wherein said vertical timing control circuit including a counter for counting the number of horizontal scanning lines of the image signal output in the vertical scanning period and suppresses the next vertical scanning timing signal from being output until a count value of the counter reaches a predetermined value.

7. The image pickup apparatus according to claim 6, wherein the count value of said counter is a prescribed value corresponding to the number of scanning lines configuring one screen.

8. The image pickup apparatus according to claim 4, wherein:

said vertical timing control circuit including a counter for counting the number of horizontal scanning lines of the image signal which is output in the vertical scanning period and suppresses the next vertical scanning timing signal from being output until a count value of the counter reaches a predetermined value; and said exposure control circuit keeps the exposure time currently determined while said vertical timing control circuit suppresses the vertical scanning timing signal from being output.

9. The image pickup apparatus according to claim 8, wherein the count value of said counter is a prescribed value corresponding to the number of scanning lines configuring one screen.

10. The image pickup apparatus according to claim 4, wherein said horizontal timing control circuit activates the drive circuit in response to the transfer trigger from said computer equipment and invalidates the next transfer trigger for a given period which is determined according to the number of pixels corresponding to one horizontal scanning line of said solid state image pickup device and a drive frequency of said drive circuit.

11. An image pickup apparatus for capturing an image of an object and supplying computer equipment with information of the image on a screen-by-screen basis, comprising:

a solid state image pickup device on which a plurality of pixels are arranged in the form of a matrix, for accumulating information charges corresponding to the object image on the respective pixels;

a vertical timing control circuit for determining repeatedly a vertical scanning period of said solid state image pickup device in a given period according to a reference clock with a given cycle;

a horizontal timing control circuit for determining horizontal scanning timing of said solid state image pickup device, and generating a horizontal transfer flag which designates a transferring period of information charges for one line, in response to a transfer trigger supplied from said computer equipment synchronized with the reference clock;

a drive circuit for discharging said information charges accumulated on the respective pixels of said solid state image pickup device and outputting an image signal to transfer sequentially on a line-by-line basis information charges newly stored after a lapse of a desired period upon being controlled by said vertical timing control circuit and said horizontal timing control circuit; and an exposure control circuit for determining a timing for discharging said information charges of said solid state image pickup device according to a level of said image signal; wherein:

said horizontal timing control circuit rises and clears said horizontal transfer flag corresponding to shift of a horizontal transferring timing of information charges for one line; and said exposure control circuit receives said horizontal transfer flag from said horizontal timing control circuit and completes the discharge of said information charges of said solid state image pickup device within a blanking period, except for the transferring period, determined by the horizontal transfer flag during the vertical scanning period.

12. An image pickup apparatus for capturing an image of an object and supplying computer equipment with information of the image on a screen-by-screen basis, comprising:

a solid state image pickup device having a plurality of pixels disposed in the form of a matrix with information charges corresponding to the object image produced and accumulated, a plurality of vertical shift registers disposed parallel to one another for temporarily storing a plurality of information charge packets read from the pixels respectively, a horizontal shift register for receiving sequentially the information charge packets from the respective vertical shift registers and outputting to transfer horizontally the plurality of information charge packets, and a drain for discharging the-information charges accumulated in the pixels;

a vertical timing control circuit for producing a vertical scanning timing signal at vertical scanning periods defined by a prescribed clock number of a reference clock with a fixed cycle;

a horizontal timing control circuit for generating a horizontal scanning timing signal and a horizontal transfer flag which designates a transferring period of information charges for one line, in response to a transfer trigger which is output from said computer equipment;

a drive circuit for transferring the information charge packets from the pixels to the vertical shift register according to the vertical scanning timing signal and, according to the horizontal scanning timing signal, transferring vertically the information charge packets from the vertical shift register to the horizontal shift register and driving the horizontal shift register to obtain an image signal; and an exposure control circuit for determining timing to discharge the information charges of said solid state image pickup device so that an exposure time, being a period between the discharge of the information charges from the pixels to the drain and the transfer of the information charges from the pixels to the vertical shift register, becomes of a period corresponding to a level of the image signal; wherein:

said horizontal timing control circuit rises and clears said horizontal transfer flag corresponding to shift of a horizontal transferring timing of information charges for one line; and the drive circuit discharges the information charges at a timing defined by the exposure control circuit; and said exposure control circuit receives said horizontal control flag from said horizontal timing control circuit and completes the discharge of said information charges within a blanking period, except for the transferring period, determined by the horizontal transfer flag during the vertical scanning period.

* * * * *